(12) United States Patent
Bacaloglu et al.

(10) Patent No.: US 7,390,846 B2
(45) Date of Patent: Jun. 24, 2008

(54) WOOD SIZING AGENTS FOR PVC COMPOSITES

(75) Inventors: Radu Bacaloglu, Hamburg, NJ (US); Phillip Kleinlauth, West Milford, NJ (US); Peter Frenkel, Danbury, CT (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 11/001,558

(22) Filed: Nov. 30, 2004

(65) Prior Publication Data

US 2006/0116447 A1 Jun. 1, 2006

(51) Int. Cl.
*C08L 97/02* (2006.01)
*C08L 97/00* (2006.01)
*C08K 9/00* (2006.01)

(52) U.S. Cl. ............................ 524/13; 524/68; 524/527; 524/539

(58) Field of Classification Search .................. 525/85, 525/78, 195, 201; 524/13, 17, 68, 527, 539
See application file for complete search history.

(56) References Cited

U.S. PATENT DOCUMENTS

| | | | | |
|---|---|---|---|---|
| 2,909,447 A | * | 10/1959 | Scott | 428/389 |
| 3,547,930 A | * | 12/1970 | Blomqvist et al. | 604/366 |
| 4,294,873 A | * | 10/1981 | Hartmann et al. | 427/391 |
| 4,354,487 A | * | 10/1982 | Oczkowski et al. | 604/366 |
| 4,594,372 A | | 6/1986 | Natov et al. | 523/208 |
| 4,687,793 A | * | 8/1987 | Motegi et al. | 523/200 |
| 4,906,248 A | * | 3/1990 | Kyochika et al. | 8/589 |
| 5,202,381 A | * | 4/1993 | Parker | 525/85 |
| 5,252,667 A | * | 10/1993 | Parker | 525/85 |
| 5,441,801 A | * | 8/1995 | Deaner et al. | 428/326 |
| 5,981,067 A | | 11/1999 | Seethamraju et al. | 428/393 |
| 6,015,612 A | | 1/2000 | Deaner et al. | 428/326 |
| 6,210,792 B1 | | 4/2001 | Seethamraju et al. | 428/326 |
| 6,248,813 B1 | | 6/2001 | Zehner | 524/13 |
| 6,280,667 B1 | | 8/2001 | Koenig et al. | 264/68 |
| 6,531,533 B1 | | 3/2003 | Kuhn et al. | 524/450 |
| 6,610,218 B1 | * | 8/2003 | Duvall et al. | 252/402 |

FOREIGN PATENT DOCUMENTS

| | | |
|---|---|---|
| CA | 763000 | 7/1967 |
| EP | 0046579 | 8/1981 |
| EP | 0284058 | 3/1988 |
| FR | 2514773 | 10/1981 |
| GB | 2192397 | 3/1987 |
| GB | 2192398 | 3/1987 |

OTHER PUBLICATIONS

Kokta et al., Composites of Polyvinyl Chloride . . . , Journal of Vinyl Tech., vol. 12, No. 3, Sep. 1990, pp. 146-153.
Matuana, Influence of Interfacial Interactions on the Properties of PVC/Cellulosic Fiber Composites, Polymer Composites, vol. 19, No. 4, Aug. 1998, pp. 446-455.
Fernandez et al., Aminosilane Superficial Treatment of Lignocelulosic Fillers . . . , Proceedings ANTEC 2002.
Maldas et al., Effects of Coating Treatments on the Mechanical Behavior of Wood Fiber-Filled Polystyrene Composites, Journal of Reinforced Plastics and Composites, vol. 8, Jan. 1990, pp. 2-12.
Kokta et al., Composites of Poly(Vinyl Chloride) and Wood Fibers, Polymer Composites, vol. 11, No. 2, Apr. 1990, pp. 84-89.
Guffey et al., PVC/Wood Flour Composites Compatibilized with Chlorinated Polyethylene, Proceedings ANTEC 2002.
Natov et al., Fullung von Polyvinylchlorid mit Holzmehl, Plaste und Kautschuk, vol. 29, 1982, pp. 277-278.
Joo et al., Utilization of Rheology Control to Develop Wood-Grain . . . , Intern. Polymer Processing XIV, 1999, pp. 10-20.
Mengeloglu et al., Effects of Impact Modifiers on the Properties of Rigid PVC/Wood-Fiber Composites, Journal of Vinyl & Additive Tech., vol. 6, No. 3, Sep. 2000, pp. 153-157.
Rusu et al., Industria USOARA 30, 1983, nr. 11, pp. 504-508.
Godavarti, An On-Line Analytical Method for Quality Control for Bio-Fiber Reinforced Composites, Proceedings ANTEC 2003, pp. 2044-2046.

* cited by examiner

*Primary Examiner*—Randy Gulakowski
*Assistant Examiner*—Saira Haider
(74) *Attorney, Agent, or Firm*—Daniel Reitenbach

(57) ABSTRACT

Disclosed herein is a process for improving mechanical properties and thermal stability of composites of poly(vinyl chloride) and at least one natural fiber comprising including in said composite an agent comprising a polymer or copolymer comprising at least one alkali metal salt of at least one polymerized ethylenically unsaturated carboxylic acid. Articles of manufacture comprising the stabilized PVC are also disclosed.

6 Claims, No Drawings

WOOD SIZING AGENTS FOR PVC COMPOSITES

BACKGROUND OF THE INVENTION

1. Field of the Invention

This invention relates to the field of additives, and, more specifically, to wood sizing agents for poly(vinyl chloride)-wood composites used as building materials for decking, railing, window lineals, roofing shingles, fencing, siding, furniture, and the like.

2. Description of Related Art

Wood-poly(vinyl chloride) (PVC) composites are materials that look like wood and are used on a large scale in the building industry because of their low-cost maintenance and resistance to biological degradation. Being a component of the composite material, wood is known to negatively affect mechanical properties, such as tensile strength, impact strength, or flexural strength. These properties can be improved by assuring good adhesion of the PVC to the wood particles by preventing the thermal degradation of the PVC.

Attempts to improve the adhesion of PVC to wood particles have been directed primarily to the use of compatibilizers, such as those listed in the following groups:

Unsaturated, epoxy, amino, thio-alkyl trialkoxysilanes:
U.K. Patent Application GB 2 192 397 A;
Kotka, B. V., et al., *J. Vinyl Technol.* 12:146-153 (1990);
Matuana, L. M., et al., *Polymer Composites* 19:446-455 (1998);
Rodriguez-Fernandez, O. S., et al., *Proceedings ANTEC 2002* (2002).

Isocyanates and polymeric isocyanates:
U.K. Patent Application GB 2 192 398 A;
Maldas, D., et al., *J. Reinforced Plastics and Composites* 8:2 (1990);
U.S. Pat. No. 6,248,813.

Carboxylic acids, anhydrides and polymeric anhydrides:
Matuana, L. M., et al., *Polymer Composites* 19:446-455 (1998);

Carboxylic acids:
Kotka, B. V., et al. *Polymer Composites* 11:84-89 (1990).
U.S. Pat. No. 6,210,792.

Chlorinated polyethylene and polyvinyl chloride copolymers:
Guffey, V. O., et al., *Proceedings ANTEC 2002* (2002).
European application No. 0046579

Phenol-, melamine-, urea-formaldehyde resins:
Natow, M. et al., *Plaste und Kautschuk* 29:277-278 (1982);
Canadian Patent No. 763,000;
U.S. Pat. No. 4,594,372.

Acrylonitrile, methacrylates, vinyl acetate, acrylicimide, styrene and acrylamide polymers and copolymers:
U.S. Pat. No. 6,210,792;
U.S. Pat. No. 5,981,067.

The following types of stabilizers are listed in the literature for use in PVC-wood composites:

Organotin thioglycolates and laurates:
U.S. Pat. No. 5,981,067
U.S. Pat. No. 6,015,612;
U.S. Pat. No. 6,210,792;
Joo, Y. L., et al., *Proceedings Intern. Polymer Processing XIV*: 10-20 (1999);
Mengeloglu, F., et al., *J. Vinyl & Additive Technol.* 6:153-157 (2000).

Tribasic lead sulfate, lead stearate:
U.S. Pat. No. 4,594,372
French Patent No. 2 514 773;
European Patent Application No. 0 284 058 A2;
Rusu, M., et al., *Industria Usoara* 30:504-508 (1983).

Barium acetate:
Kotka, B. V., et al., *J Vinyl Technol.* 12:146-153 (1990);
Kotka, B. V., et al. *Polymer Composites* 11:84-89 (1990).

Alkyltin reverse esters sulfides, alkyltin maleates, and complex mixtures of calcium and zinc carboxylates and/or acetylacetonates:
R. Bacaloglu, P. Kleinaluth, P. Frenkel, P. Reed, and C. Coursen, U.S. patent application Ser. No. 10/827,823, filed Apr. 20, 2004.

U.S. Pat. No. 5,981,067 relates to a composite pellet comprising a thermoplastic polymer and wood fiber composite that can be used in the form of a linear extrudate or thermoplastic pellet to manufacture structural members. The fiber can be modified to increase compatibility. The polymer and wood fiber composite may contain an intentional recycle of a waste stream which can comprise adhesive, paint, preservative, or other chemical waste stream common in the wood-window or door manufacturing process. The initial mixing step before extrusion of the composite material insures substantial mixing and melt contact between molten polymer and wood fiber. The extruded pellet is said to comprise a consistent proportion of polymer, wood fiber and water.

U.S. Pat. No. 6,280,667 discloses polymer/wood fiber composite structural members that can be manufactured in an extrusion process engineered to produce materials that are said to be of high quality. The composite can be in a linear extrudate or pellet and can have a cross-section of any arbitrary shape, or can be a regular-geometric or of arbitrary-amorphous shape. The extruded material comprises a consistent proportion of polymer, wood fiber and water. During the extrusion, water is removed intentionally to dry the material to a maximum water content of less than about 10 wt-% based on the pellet weight. To make a structural unit, the pellet is introduced into an extruder apparatus wherein, under conditions of controlled mass throughput, shear, mechanical energy input, controlled temperature and pressure, the composite material is produced.

Godavarti, S., *Proceedings ANTEC* 2003:2044-2046 (2003) a method to monitor quality of wood fiber reinforced thermoplastics based on the free, unreacted acid in the composite.

SUMMARY OF THE INVENTION

The present invention is directed to a process for improving mechanical properties and thermal stability of composites of poly(vinyl chloride) and at least one natural fiber comprising including in said composite an agent comprising a polymer or copolymer comprising at least one alkali metal salt of at least one polymerized ethylenically unsaturated carboxylic acid.

In another aspect, the present invention is directed to an article of manufacture comprising a composite of poly(vinyl chloride), at least one natural fiber, and at least one agent comprising a polymer or copolymer comprising at least one alkali metal salt of at least one polymerized ethylenically unsaturated carboxylic acid.

The present invention improves both heat stability and mechanical properties of wood-PVC composites using wood sizing agents that are applied as aqueous solutions on the surface of wood. Salts of poly(acrylic acid) and its derivatives were used as the agents. They may be used in conjunction with conventional heat stabilizers that are added to PVC resins.

DESCRIPTION OF THE PREFERRED EMBODIMENTS

The wood sizing agents of the present invention are polymers or copolymers comprising at least one alkali metal salt of at least one polymerized ethylenically unsaturated carboxylic acid. Preferably, the ethylenically unsaturated carboxylic acid is selected from the group consisting of acrylic acid, methacrylic acid, maleic acid, crotonic acid, and mixtures thereof. Copolymers of such ethylenically unsaturated carboxylic acids with other ethylenically unsaturated compounds, such as, acrylamide, methacrylamide, acrylonitrile, methacrylonitrile, acrylic acid esters, methacrylic acid esters, vinyl acetate, and styrene are also within the scope of the present invention.

More preferably, the wood sizing stabilizers of the present invention are alkali metal, e.g., sodium, potassium, or lithium, salts of poly(acrylic acid), poly(methacrylic acid), poly (crotonic acid), or poly(maleic acid) or copolymers of the foregoing, or their copolymers with acrylamide, acrylonitrile, or vinyl acetate.

In the present invention, improvement of thermal stability and mechanical properties of PVC-Wood composites is achieved by using such wood-sizing agents either alone or in conjunction with conventional PVC stabilizers.

The sizing agents employed in the practice of the present invention can be incorporated into the composite in any of several ways. For example, the agent can first be mixed with the PVC and then the natural fiber can be added to the mixture. Alternatively, the agent can first be mixed with the natural fiber and then the PVC can be added to the mixture. In another alternative, the PVC and the natural fiber are first blended together and then the agent is added to the blend. In still another alternative, all three components are mixed together simultaneously, as, for example, in an extruder. Preferably, the agent is first mixed with the natural fiber and then the PVC is added to the mixture.

As employed herein, the term poly(vinyl chloride), or PVC, is intended to include both homopolymers and copolymers of vinyl chloride, i.e., vinyl resins containing vinyl chloride units in their structure, e.g., copolymers of vinyl chloride and vinyl esters of aliphatic acids, in particular vinyl acetate; copolymers of vinyl chloride with esters of acrylic and methacrylic acid and with acrylonitrile; copolymers of vinyl chloride with diene compounds and unsaturated dicarboxylic acids or anhydrides thereof, such as copolymers of vinyl chloride with diethyl maleate, diethyl fumarate or maleic anhydride; post-chlorinated polymers and copolymers of vinyl chloride; copolymers of vinyl chloride and vinylidene chloride with unsaturated aldehydes, ketones and others, such as acrolein, crotonaldehyde, vinyl methyl ketone, vinyl methyl ether, vinyl isobutyl ether, and the like.

The term "PVC" as employed herein is also intended to include graft polymers of PVC with EVA, ABS, and MBS. Preferred substrates are also mixtures of the above-mentioned homopolymers and copolymers, in particular vinyl chloride homopolymers, with other thermoplastic and/or elastomeric polymers, in particular blends with ABS, MBS, NBR, SAN, EVA, CPE, MBAS, PMA, PMMA, EPDM, and polylactones.

Within the scope of this invention, PVC will also be understood to include recyclates of halogen-containing polymers, which are the polymers described above in more detail and which have suffered damage by processing, use or storage. PVC recyclate is particularly preferred. The recyclates may also contain minor amounts of foreign materials, typically paper, pigments, adhesives or other polymers, which are often difficult to remove. These foreign materials can also originate from contact with different substances during use or working up, for example fuel residues, paint components, metal traces, initiator residues, and water traces.

The primary requirement for the PVC material is that it retain sufficient thermoplastic properties to permit flux melt blending with wood and other natural fibers, permit formation of linear extrudate pellets, and to permit the composition material or pellet to be extruded or injection molded in a thermoplastic process forming a rigid structural member. PVC homopolymers, copolymers, and polymer alloys are available from a number of manufacturers including B.F. Goodrich, Vista, Air Products, Occidental Chemicals, etc. Preferred poly(vinyl chloride) materials are PVC homopolymers having molecular weights of about 10,000 to 250,000, preferably about 20,000 to 90,000.

Suitable biofibers for use in the practice of the present invention may be derived from any of a number of available sources, such as ground wood, sawdust, wood flour, ground newsprint, magazines, books, cardboard, wood pulps (mechanical, stone ground, chemical, mechanical-chemical, bleached or unbleached, sludge, waste fines), and various agricultural wastes (rice hulls, wheat, oat, barley and oat chaff, coconut shells, peanut shells, walnut shells, straw, corn husks, corn stalks, jute, hemp, bagasse, bamboo, flax, and kenaf).

Wood fiber, which is preferred because of its abundance and suitability can be derived from either soft woods or evergreens or from hard woods commonly known as broad leaf deciduous trees. Soft woods are generally preferred for fiber manufacture because the resulting fibers are longer and contain higher percentages of lignin and lower percentages of hemicellulose than hard woods. While soft wood is the primary source of fiber for use in the practice of the present invention, additional fiber make-up can be derived from a number of secondary or fiber reclaim sources, including bamboo, rice, sugar cane, flex, kenaf and recycled fibers from newspapers, boxes, computer printouts, and the like.

A preferred source for wood fiber comprises the wood fiber by-product of sawing or milling soft woods commonly known as sawdust or milling tailings. Such wood fiber has a regular reproducible shape and aspect ratio. The fibers are commonly at least 0.1 mm in length, at least 0.01 mm in thickness and commonly have an aspect ratio of at least 1.8. Preferably, the fibers are 0.2 to 10 mm in length, 0.02 to 1.5 mm in thickness with an aspect ratio between 2 and 7, preferably 2.5 to 6.0. The preferred fiber is derived from processes common in the manufacture of windows and doors. Wooden members are commonly ripped or sawed to size in a cross grain direction to form appropriate lengths and widths of wood materials. The by-product of such sawing operations is a substantial quantity of sawdust. In shaping a regular shaped piece of wood into a useful milled shape, wood is commonly passed through machines that selectively remove wood from the piece leaving the useful shape. Such milling operations produce substantial quantities of sawdust or mill tailing by-products. Lastly, when shaped materials are cut to size and mitered joints, butt joints, overlapping joints, mortise and tenon joints are manufactured from pre-shaped wooden members, substantial waste trim is produced. Such large trim pieces are commonly cut and machined to convert the larger objects into wood fiber having dimensions approximating sawdust or mill tailing dimensions. The wood fiber sources can be blended regardless of particle size and used to make the composite. The fiber stream can be pre-sized to a preferred range or can be sized after blending. Further, the fiber can be pre-pelletized before use in composite manufacture.

The poly(vinyl chloride) and wood fiber can be combined and formed into pellets using, for example, thermoplastic extrusion processes, and the wood fiber can be introduced into the pellet making process in a number of sizes. Preferably, the wood fiber should have a minimum size of length and width of at least about 1 mm because wood flour tends to be explosive at certain wood to air ratios. Further, wood fiber of appropriate size of an aspect ratio greater than 1 tends to increase the physical properties of the extruded structural member. However, useful structural members can be made with fibers of very large size. Fibers that are up to 3 cm in length and 0.5 cm in thickness can be used as input to the pellet or linear extrudate manufacture process. However, particles of this size do not produce the highest quality structural members or maximized structural strength. The best appearing products with maximized structural properties are manufactured within a range of particle sizes as set forth below. Further, large particle wood fibers can be reduced in size by grinding or other similar processes that produce a fiber similar to sawdust having the stated dimensions and aspect ratio. One further advantage of manufacturing sawdust of the desired size is that the material can be pre-dried before introduction into the pellet or linear extrudate manufacturing process. Further, the wood fiber can be pre-pelletized into pellets of wood fiber with small amounts of binder if necessary.

During the pelletizing process for the composite pellet, the PVC and wood fiber are intimately contacted at high temperatures and pressures to ensure that the wood fiber and polymeric material are wetted, mixed, and extruded in a form such that the polymer material, on a microscopic basis, coats and flows into the pores, cavities, etc., of the fibers. The fibers are preferably substantially oriented by the extrusion process in the extrusion direction. Such substantial orientation causes the overlapping of adjacent parallel fibers and the polymeric coating of the oriented fibers, resulting in a material useful for the manufacture of improved structural members having improved physical properties. The degree of orientation is typically about 20%, preferably 30% above random orientation, which is about 45 to 50%, said orientation being percents above the normal orientation.

Moisture control is an important element of manufacturing a useful linear extrudate or pellets. Depending on the equipment used and processing conditions, control of the water content of the linear extrudate or pellet can be important in forming a successful structural member substantially free of internal voids or surface blemishes. The concentration of water present in the sawdust during the formation of pellets or linear extrudate when heated can flash from the surface of a newly extruded structural member and can come as a result of a rapid volatilization, form a steam bubble deep in the interior of the extruded member that can pass from the interior through the hot thermoplastic extrudate leaving a substantial flaw. In a similar fashion, surface water can bubble and leave cracks, bubbles, or other surface flaws in the extruded member.

Trees when cut, depending on relative humidity and season, can contain from 30 to 300 weight percent water based on fiber content. After rough cutting and finishing into sized lumber, seasoned wood can have a water content of from 20 to 30 weight percent based on fiber content. Kiln dried sized lumber cut to length can have a water content typically in the range of 8 to 12%, commonly 8 to 10 weight percent based on fiber. Some wood sources, such as poplar or aspen, can have increased moisture content while some hard woods can have reduced water content.

Because of the variation in water content of wood fiber sources and the sensitivity of extrudate to water content, control of water to a level of less than 8 weight percent in the pellet based on pellet weight can be important. When structural members are extruded in a non-vented extrusion process, the pellet should be as dry as possible and have a water content between about 0.01 and about 5 weight %, preferably less than 1 weight %. When using vented equipment in manufacturing the extruded linear member, a water content of less than about 8 weight % can be tolerated if processing conditions are such that the vented extrusion equipment can dry the thermoplastic material prior to the final formation of the structural member at the extrusion head. The pellets or linear extrudate of the invention can be made by extrusion of the PVC and wood fiber composite through an extrusion die resulting in a linear extrudate that can be cut into a pellet shape. The pellet cross-section can be any arbitrary shape depending on the extrusion die geometry.

Depending on their end use requirement, the compositions employed in the practice of the present invention can also contain further additives and stabilizers, typically potassium, sodium, calcium, magnesium, and barium soaps or tin derivatives, as well as, inter alia, plasticisers, epoxide compounds, metal perchlorates, lubricants, fillers, reinforcing agents, antioxidants, polyols, dawsonites, hydrotalcites, organic phosphites, 1,3-diketo compounds, mono-, oligo- or polymeric dihydropyridines, sterically hindered amines (HALS), light stabilisers, UV absorbers, lubricants, fatty acid esters, paraffins, blowing agents, fluorescent whitening agents, pigments, flame retardants, antistatic agents, aminocrotonates, thiophosphates, gelling assistants, metal deactivators, peroxide scavenging compounds, modifiers and further sequestrants for Lewis acids, and the like, all as described in detail in U.S. Pat. No. 6,531,533 the disclosure of which is incorporated herein by reference in its entirety.

Various features and aspects of the present invention are illustrated further in the examples that follow. While these examples are presented to show one skilled in the art how to operate within the scope of the invention, they are not intended in any way to serve as a limitation upon the scope of the invention.

EXAMPLES

In the presented examples the following stabilizers were used:

Stabilizer B1: sodium salt of poly(acrylic acid) MW=2100;
Stabilizer B2: sodium salt of poly(acrylic acid) MW=1200;
Stabilizer C4: sodium salt of poly(acrylic co maleic acid) MW=70000;
Stabilizer G1: sodium salt of poly(methacrylic acid) MW=6500;
Stabilizer H1: sodium salt of poly(acrylamide co acrylic acid);

The formulations used are presented in the Table 1.

TABLE 1

Formulation for Wood-PVC composites

| Material | Concentration (phr) |
| --- | --- |
| PVC Oxy185F | 100 |
| PA 40/PA 101 | Total 6.0 |

TABLE 1-continued

Formulation for Wood-PVC composites

| Material | Concentration (phr) |
| --- | --- |
| CPE 3615P | 5.0 |
| Ca Stearate | Variable, see Table 2 |
| Paraffin Wax/Marklube L-106 | Total 1.3 |
| AC629A | 0.2 |
| PVC Stabilizer | Variable, see Table 2 |
| WS Stabilizer | Variable, see Table 2 |

PVC Oxy 185F is a suspension PVC resin from OxyVinyl with K=56.

PA 40 and PA 101 are acrylic impact modifiers from Kanaka.

CPE-3615P is a chlorinated polyethylene wax impact modifier from Dow.

AC 629A is an oxidized polyethylene lubricant from Honeywell.

Marklube L-106 is a lubricant from Crompton Corporation.

All the components of the PVC formulation were placed in a Papemneier mixer and mixed for 5 minutes at the low setting and 10 minutes at the high setting. The temperature increased from 25 to 50° C.

Wood flour Standard Softwood Grade 4020 from American Wood Fiber Corp. was stirred and treated with an aqueous solution of a wood sizing agent and dried under vacuum at 80-90° C. to reach a water content below 1%. The treated wood flour was added to PVC at 40% and mixed on a roller mixer for 1 hour.

Testing was carried out using a 7001 Capillary rheometer (Dynisco Polymer Test) with a slit die 8 mm×3 mm×30 mm at 190° C. (melt time 180 seconds).

Strips of 8×3×170 mm were obtained using 15 grams of the wood-PVC compound (plunger rate 2 mm/min, shear rate 8.82 s$^{-1}$) and thermal degradation was studied by monitoring the apparent melt viscosity and the discoloration of these strips as a function of time.

Apparent melt viscosity decreases linearly as a function of time owing to the PVC degradation and reduction in cohesion of the wood-PVC compound. The slope of this line is defined as the rate of degradation measured by viscometry ($k_v$) (Table 2).

Discoloration of the wood-PVC strips due to thermal degradation was monitored by computer scanning using a Fluoscan program and the L*, a*, and b* values were calculated according to ASTM D2244 1993. From those values the total color change ($\Delta E^*$) was calculated using the formula:

$$\Delta E^* = (\Delta L^{*2} + \Delta a^{*2} + \Delta b^{*2})^{1/2}$$

$\Delta E^*$ increases linearly with time and the slope was defined as the discoloration rate of degradation ($k_{\Delta E^*}$) (Table 2)

The rate constants of degradation measured by viscosimetry ($k_v$) are proportional to the rate constants of degradation measured by discoloration ($k_{\Delta E^*}$)

$$k_v = 144.8 \times k_{\Delta E^*} + 38.18 \, r = 0.926$$

demonstrating that the change in viscosity and the discoloration are the results of the same process, PVC degradation.

At a high plunger rate of the capillary rheometer (200 mm/min, shear rate 882.5 s$^{-1}$) strips were obtained with practically no signs of PVC degradation and were used for the measurement of tensile strength and tensile modulus using a Series IX Automated Materials Testing System from Instron Corporation (Table 2).

The conventional PVC (matrix) stabilizers, such as organotin derivatives (Mark 1900) or zinc-containing materials (Zn stearate or Zn acelylacetonate), were also added to the PVC compound to reduce degradation of PVC.

Wood sizing agents were shown to improve both heat stability and mechanical properties of the composites.

In certain cases, the two types of stabilizers used in combination were found to exhibit a synergistic effect (Examples 1, 2, and 3 in Table 2).

TABLE 2

Wood - PVC Composites Stabilization

| | Matrix Stabilizer | | Ca Stearate | Wood Sizing Stabilizer | | | Degradation Rate | | |
| --- | --- | --- | --- | --- | --- | --- | --- | --- | --- |
| Example | Type | phr | phr | Type | phr | mM/g wood | ΔE*/min | η/min | Load at break |
| 1 | Mark 1900 | 1.5 | 1.2 | — | — | — | 0.600 | 110.3 | 2884 |
| 2 | Mark 1900 | 1.5 | 1.2 | C4 | 2 | 0.425 | 0.241 | 76.4 | 2449 |
| 3 | Mark 1900 | 1.5 | 1.2 | C4 | 4 | 0.850 | 0.142 | 69.2 | 2404 |
| 4 | Mark 1900 | 1.5 | 1.2 | B2 | 1.8 | 0.372 | 0.203 | 70.2 | 2389 |
| 5 | Mark 1900 | 1.5 | 1.2 | H1 | 1.6 | 0.348 | 0.444 | 89.1 | 2525 |
| 6 | Zn Stearate | 0.6 | 0.6 | B2 | 2 | 0.425 | 0.246 | 90.6 | 2454 |
| 7 | Zn Stearate | 0.6 | 0.6 | B1 | 2 | 0.425 | 0.634 | 118.5 | 2781 |
| 8 | ZnAC AC | 0.25 | 1.2 | B1 | 2 | 0.425 | 0.654 | 101.8 | 2902 |
| 9 | Zn Stearate | 0.6 | 0.6 | G1 | 2 | 0.425 | 0.900 | 188.4 | 3536 |
| 10 | ZnAC AC | 0.25 | 1.2 | G1 | 2 | 0.425 | 0.611 | 137.0 | |

TABLE 2-continued

Wood - PVC Composites Stabilization

| Example | Matrix Stabilizer Type | phr | Ca Stearate phr | Wood Sizing Stabilizer Type | phr | mM/g wood | Degradation Rate ΔE*/min | η/min | Load at break |
|---|---|---|---|---|---|---|---|---|---|
| 11 | ZnACAC | 0.25 | 1.2 | G1 | 2 | 0.425 | | 152.4 | |

Mark 1900 is a stabilizer commercially available from Crompton Corporation;

ZnACAC is Zinc bis (acetylacetonate).

Na poly(methacrylate) used in the presence of Zn stearate improved the tensile strength. (Example 9, Table 2)

In view of the many changes and modifications that can be made without departing from principles underlying the invention, reference should be made to the appended claims for an understanding of the scope of the protection afforded the invention.

What is claimed is:

1. A process for providing composites of PVC and wood fiber having improved mechanical properties and thermal stability comprising the steps of:
   (A) dissolving a sizing agent comprising a polymer or copolymer comprising at least one alkali metal salt of at least one polymerized ethylenically unsaturated carboxylic acid in water to form an aqueous solution of the sizing agent;
   (B) adding wood fibers to the aqueous solution formed in (A);
   (C) separating and drying the wood fiber to a water content below 1%, whereby a coating of the water soluble sizing agent is formed on the surface of the wood fibers;
   (D) combining the sized wood fibers of (C) with PVC at elevated temperature to form composites comprising the sized wood fiber dispersed in a matrix of PVC having improved mechanical properties and thermal stability;

wherein said polymer or copolymer is selected from the group consisting of alkali metal salts of:
   (1) poly(acrylic acid), poly(methacrylic acid), poly(crotonic acid), poly(maleic acid), or mixtures thereof; and
   (2) copolymers of acrylic acid, methacrylic acid, crotonic acid, or maleic acid with a comonomer selected from the group consisting of acrylamide, methacrylamide, acrylonitrile, methacrylonitrile, acrylic acid esters, methacrylic acid esters, and styrene.

2. The process of claim 1 wherein the polymer or copolymer is selected from the group consisting of alkali metal salts of poly(acrylic acid), poly(methacrylic acid), poly(crotonic acid), poly(maleic acid), and mixtures thereof.

3. The process of claim 1 wherein the sizing agent is a copolymer of an alkali metal salt of acrylic acid, methacrylic acid, crotonic acid, or maleic acid with a comonomer selected from the group consisting of acrylamide, methacrylamide, acrylonitrile, methacrylonitrile, acrylic acid esters, methacrylic acid esters, and styrene.

4. The process of claim 1 wherein the wood fiber is selected from the group consisting of wood flour and sawdust.

5. The process of claim 4 wherein the wood fiber is wood flour.

6. The process of claim 1 wherein the polymer or copolymer is selected from the group consisting of alkali metal salts of poly(acrylic acid), poly(methacrylic acid), and poly(acrylamide co acrylic acid).

* * * * *